(12) United States Patent
Chen

(10) Patent No.: US 9,109,923 B2
(45) Date of Patent: Aug. 18, 2015

(54) ELECTROMAGNETIC PUSHING AND KNOCKING-TYPE OBJECT DETECTOR

(76) Inventor: Yihua Chen, Yueyang (CN)

( * ) Notice: Subject to any disclaimer, the term of this patent is extended or adjusted under 35 U.S.C. 154(b) by 164 days.

(21) Appl. No.: 14/000,564

(22) PCT Filed: Mar. 7, 2012

(86) PCT No.: PCT/CN2012/072070
§ 371 (c)(1),
(2), (4) Date: Aug. 20, 2013

(87) PCT Pub. No.: WO2012/119553
PCT Pub. Date: Sep. 13, 2012

(65) Prior Publication Data
US 2013/0328552 A1 Dec. 12, 2013

(30) Foreign Application Priority Data
Mar. 8, 2011 (CN) .......................... 2011 1 0054676

(51) Int. Cl.
*G01S 7/14* (2006.01)
*G01D 5/14* (2006.01)
(Continued)

(52) U.S. Cl.
CPC ............ *G01D 5/142* (2013.01); *G01F 23/0007* (2013.01); *G01F 23/0023* (2013.01); *G01F 23/22* (2013.01)

(58) Field of Classification Search
CPC . G01D 5/142; G01F 23/0007; G01F 23/0023; G01F 23/22; G01N 11/16
USPC ............ 324/207.11–207.26; 73/54.25–54.27
See application file for complete search history.

(56) References Cited

U.S. PATENT DOCUMENTS 5,483,131 A * 1/1996 Ito ................................. 318/130

FOREIGN PATENT DOCUMENTS

| CN | 2441223 | 8/2001 |
|----|---------|--------|
| CN | 2522840 | 11/2002 |

(Continued)

OTHER PUBLICATIONS

International Search Report for PCT/CN2012/072070.
(Continued)

*Primary Examiner* — Arleen M Vazquez
*Assistant Examiner* — Steven Yeninas
(74) *Attorney, Agent, or Firm* — Lihua Zheng; Proskauer Rose LLP

(57) ABSTRACT

A level sensor, particularly an electromagnetic pushing and knocking-type object detector, comprising: a magnetic swinging rod, an electromagnet that is disposed on one side of the magnetic swinging rod, and an electronic module that controls the electromagnet in driving the magnetic swinging rod to swing, and amplifies, processes, and time-delay outputs the swinging signals of the magnetic swinging rod, which swinging signals are collected by the electromagnet, said magnetic swinging rod is suspended with a suspension device on one side of a main housing, and the electromagnet, which is composed of an electromagnet iron core and an electromagnet coil, is disposed inside the main housing. The electric module comprises a power supply circuit, a pulse generation circuit, a pulse driving circuit, a signal amplification circuit, a signal processing circuit, and a signal time delay output circuit, and the aforementioned circuits are all disposed in the main housing or are isolated from the main housing and enclosed separately. The present invention has the advantages of high sensitivity, accuracy, and reliability; has a wide range of applications; is maintenance-free; and features a long service life.

8 Claims, 7 Drawing Sheets

(51) Int. Cl.
*G01F 23/00* (2006.01)
*G01F 23/22* (2006.01)

(56) References Cited

FOREIGN PATENT DOCUMENTS

| CN | 102155968 | 8/2011 |
|---|---|---|
| CN | 202002702 | 10/2011 |
| GB | 1304684 | 1/1973 |
| KR | 940003316 | 4/1994 |

OTHER PUBLICATIONS

Written Opinion for PCT/CN2012/072070.

* cited by examiner

ELECTROMAGNETIC PUSHING AND KNOCKING-TYPE OBJECT DETECTOR

CROSS REFERENCE TO PRIOR APPLICATION

This application is the U.S. national phase of the PCT application PCT/CN2012/072070, filed on Mar. 7, 2012, which in turn claims priority to Chinese patent ZL 201110054676.5 filed on Mar. 8, 2011 and granted on Feb. 22, 2012.

FIELD OF INVENTION

The present invention relates to an object-position sensor. In particular, it relates to an electromagnetic pushing and knocking-type detector.

BACKGROUND

In the documents filed for the "Mono-pendulum proximity switch" patent (Chinese patent application no. CN99249969.0, issued as Chinese patent no. CN2441223), the present applicant presented a mono-pendulum object detection method and device. It used an electromagnet to periodically attract an iron pendulum, causing it to move continually in the air as a single pendulum. In addition, it detects the movement status of the pendulum using an object-position signal-collecting component. When it swings, it emits a no-material signal. When the swinging stops, it emits a material-present signal. After many years of practical application, five deficiencies have been discovered: 1. During installation, it is necessary to ensure that the gap between the pendulum and the electromagnet is within the 6 mm to 12 mm range. If the gap is too small, then the amplitude of the pendulum's swing will be insufficient. If too large, the electromagnet cannot attract and hold the pendulum. Both of these instances have shown to adversely affect normal operation. 2. The swinging of the pendulum is driven by electromagnetic attractive force. The magnitude of the attractive force is inversely related to the square of the gap between the two. The only way to increase the maximum tolerated gap is to increase the ampere-turns and the cross-section area of the electromagnet. The consequences are a bulkier and heavier product, higher material consumption, higher power consumption, less than ideal attraction, difficulties in miniaturizing the product, high fabrication costs, as well as production and transportation challenges. 3. The high power consumption precludes the manufacture of a two-wire system, thus replacement with a two-wire system capacitance-type object-position switch is difficult. In addition, a single swing signal collection component is needed, resulting in a more complex structure. 4. The shared direction of the electromagnetic attractive force and the adhesive force facilitates adhesion, resulting in insufficient resistance to materials adhesion. 5. Poor resilience to high temperatures or high pressure. Other common object-position switches, such as rotary-resistance, tuning fork, capacitance, radio frequency admittance, and vibrating rod object-position switches, each have limitations. When a rotary-resistance switch has been operating for a long period of time, it becomes mechanically vulnerable to wear and corrosion breakdown, and may even ruin the electric motor, reducing service life. Tuning fork object-position switches tend to accumulate materials within the fork due to the adhesive effects of the materials and will cease vibrating, or long-term vibrations result in mechanical fatigue or breaking of the tuning fork; therefore reliability is low. In capacitance or radio frequency admittance object-position switches, the measurement electrodes tend to accumulate materials because of their adhesive effects. This gives rise to erroneous signals, and their sensitivity is greatly affected by temperature drift and time drift. Vibrating rod object-position switches require high voltage to begin vibrating and long resonance tubes. Their piezoelectric elements are easily affected by the environment and temperature and crack easily, and their sensitivity varies due to variations in the detected materials and therefore suffers from reliability issues. There is currently no ideal product for detecting objects under high-temperature, high-pressure, high-humidity, high-adhesion, and other harsh operating conditions.

SUMMARY OF THE INVENTION

The objective of the present invention is to design an electromagnetic pushing and knocking-type object detector. It not only decreases the number of parts, lowers costs, lowers power consumption, simplifies installation, conserves energy, and protects the environment, but it can also perform material detections reliably under various harsh operating conditions. This electromagnetic pushing and knocking-type object sensor effectively resolves difficult material detection problems regardless of whether operating conditions involve normal temperature and pressure or high temperature and pressure, solids or liquids, granular materials with good flow properties or powdered materials with poor flow properties, damp and highly adhesive materials, and materials large enough to damage the object-position switch under high impact. In addition, the electromagnetic pushing and knocking-type object sensor is highly sensitive, accurate, reliable, maintenance-free, and features a long service life.

The objective of the present invention is achieved through the technical scheme below:

The present invention comprises a magnetic swinging rod, an electromagnet that is disposed on one side of the magnetic swinging rod, and an electronic module that controls the electromagnet in driving the magnetic swinging rod to swing and amplifies, processes, and time-delay outputs the swinging signals of the magnetic swinging rod, which signals are collected by the electromagnet, wherein:

Said magnetic swinging rod is suspended with a suspension device on one side of a main housing, and the electromagnet, which is composed of an electromagnet iron core and an electromagnet coil, is disposed inside the main housing.

Said electronic module comprises a power supply circuit, a pulse generating circuit, a pulse driving circuit, a signal amplification circuit, a signal processing circuit, and a signal time delay output circuit. All of the aforementioned circuits are disposed within the main housing or are isolated from the main housing and enclosed separately.

The structural principles of the present invention:

The present invention is an object detector for electromagnetic pushing-and-knocking object-position sensors. It is a method that uses an electromagnet 3 to push an electromagnetic rod 5, which is suspended nearby and swings in air, liquid, or solids (three types of medium) and assesses whether a solid medium or a liquid medium is present based on obvious differences in the vibration amplitude or phase of the voltage signals corresponding to the swing state. It is characterized in that: the magnetic swinging rod 5 is suspended near an electromagnet iron core 31. It can swing freely in all directions. The magnetic swinging rod 5 is composed of a permanent magnet pendulum 51 and a probe swinging rod 52. The permanent magnet pendulum 51 is constructed from a permanent magnet which is disposed within a housing. The magnetic poles of the permanent magnet are arranged one above the other. In addition, the permanent magnet pendulum 51 is mounted on the probe swinging rod 52 and is near the electromagnet iron core 31. The electromagnet 3 has dual functions: driving and signal collection. The pulse generating circuit 22 and the pulse driving circuit 23 control the pulse current that flows through the electromagnet coil 32, causing the electromagnet 3 to generate a pulse electromagnetic field. Adjustments to the permanent magnet swinging rod 51 and electromagnetic field magnetic pole directions cause the two to generate a magnetic field pushing force from the same-charge repulsion generated between them. This pushes the magnetic swinging rod 5 outward a certain distance from the electromagnet 3. After the pulse current dissipates, the electromagnetic field will also immediately dissipate. The magnetic swinging rod 5 immediately swings back or knocks against and again becomes attached to the electromagnet iron core 31. This is repeated again and again. The process of the magnetic swinging rod 5 swinging back and striking the electromagnet iron core 31 causes changes in the magnetic flux passing through the electromagnet coil 32 and then, as a result of electromagnetic induction, generates voltage signals corresponding to the swings of the magnetic swinging rod 5. The polarity, amplitude of vibration, width, phase, frequency, and other such parameters of these induction voltage signals all correspond to the direction, speed, amplitude, frequency, and so on of the swings of the magnetic swinging rod 5. The damping to which the magnetic swinging rod 5 is subjected obviously varies according to the three media of gases, liquids, and solids. In a gaseous medium, the damping is minimal and can be ignored, and the induced voltage signals are the strongest. In a liquid medium, the damping is mid-range. The magnetic swinging rod 5 will tend to swing more slowly and somewhat more sluggishly than it does in a gaseous medium. Consequently, the phase of the voltage signals that are induced will lag behind somewhat. Amplitude, frequency, duration, and so on will all decrease to some extent. The maximum damping occurs in solids, perhaps even to the point that swinging becomes impossible and no voltage signals are induced. The signal processing circuit 25 can determine whether a solid medium or a liquid medium is present according to obvious differences in the vibration amplitude, phase, or other parameters of the voltage signals induced by the electromagnet 3 according to the swings of the magnetic swinging rod 5 in the three media of gases, liquids, and solids.

The present invention has the following advantages and benefits:

1. The magnetic swinging rod 5 attaches to the electromagnet 3 such that the gap between the two is extremely small. Consequently, after the electromagnet 3 is energized, the pushing force from the same-charge repulsion between it and the magnetic swinging rod 5 is very powerful. Thus, the volume of the electromagnet 3 can be greatly reduced, leading to savings in materials and lower production, transportation, and storage costs. In addition, this greatly lowers power consumption, which enables production of a micropower two-wire system product. Wiring costs can thus be reduced during installation and operation, which conserves energy.

2. The electromagnet 3 has dual functions: driving and signal collection. As soon as the electromagnet coil 32 is energized, the electric current gives rise to a magnetic field whose driving action pushes the magnetic swinging rod 5 to swing. When the power is cut, the magnetic field gives rise to an electric current, which collects signals. Changes in the magnetic flux generated by the swings of the magnetic swinging rod 5 induce voltage signals that correspond thereto. This makes it possible to dispense with an object-position signal collecting component. This simplifies the production process, saves materials, eliminates one failure link, and thus increases reliability. It is also possible to make use of a high-temperature-resistant permanent magnet pendulum 52 and an electromagnet coil 32 wound with high-temperature-resistant electromagnetic wire, which can be placed in high-temperature operating conditions while placing the electronic module 2 in a place with normal temperature. In this way, a modular high-temperature-resistant product can be made.

3. Because the magnetic fields can pass through air gaps and magnetically impermeable substances, the electromagnet 3 can, while being separated by stainless steel or another magnetically impermeable material, drive and detect the swings of the magnetic swinging rod 5, thereby realizing a no-contact transmission of driving power and a no-contact detection of magnetic fields. In this way, product can be produced that is statically sealed and resistant to high pressure.

4. Due to being driven by pushing force instead of an attractive force, and the electromagnetic pushing force and the adhesion force are in opposite directions, the resistance to the adhesion force is greatly increased. By adjusting the length and thickness of the magnetic rod 5, or by adding vanes, cylinders, spheres, cones, or other damping components at its base, the magnitude of damping can be changed. It is thus possible to manufacture a product that is suited to the detection of various materials, such as granular materials, powder materials, and block materials. By increasing the length of the magnetic swinging rod 5, it is also possible to avoid erroneous movements that arise from hollows formed in materials. In addition, the magnetic swinging rod 5, by continually striking a housing 4, performs a dust-removal and self-cleaning action.

5. Any material that causes variations in the damping of the swings of magnetic swinging rod 5 can be detected. Not only can the presence or absence of solid or liquid media be detected, but also layer-dividing interfaces, such as the interface between oil and water, the interface between liquid and foam, the interface between wastewater and sludge, and the interface between cement fluidizing and non-fluidizing, can be detected.

Therefore, this electromagnetic pushing-and-knocking object detector has the advantages of high sensitivity, accuracy, reliability, and a wide range of applications, is maintenance-free, and has a long service life.

All embodiments that make use of other single magnetic swinging rod 5 swing signal-collecting components belong within the protective scope of the present invention. For example: magnetoresistive sensors, Hall proximity sensors, electric vortex sensors, inductive proximity sensors, piezoelectric elements, and acceleration sensors.

Figure 1:
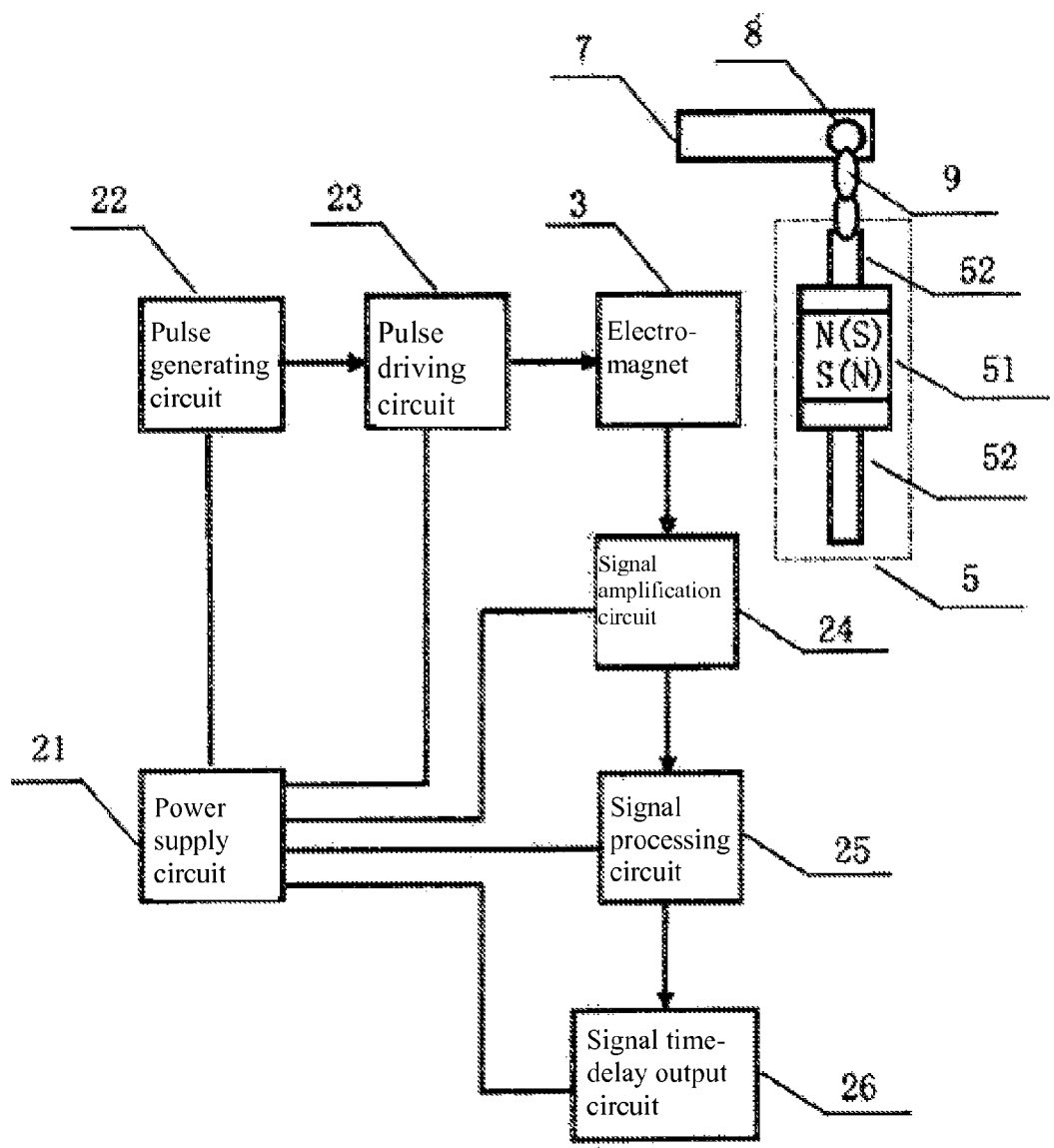
FIG. 1 is a functional block diagram of the present invention.
Figure 2:
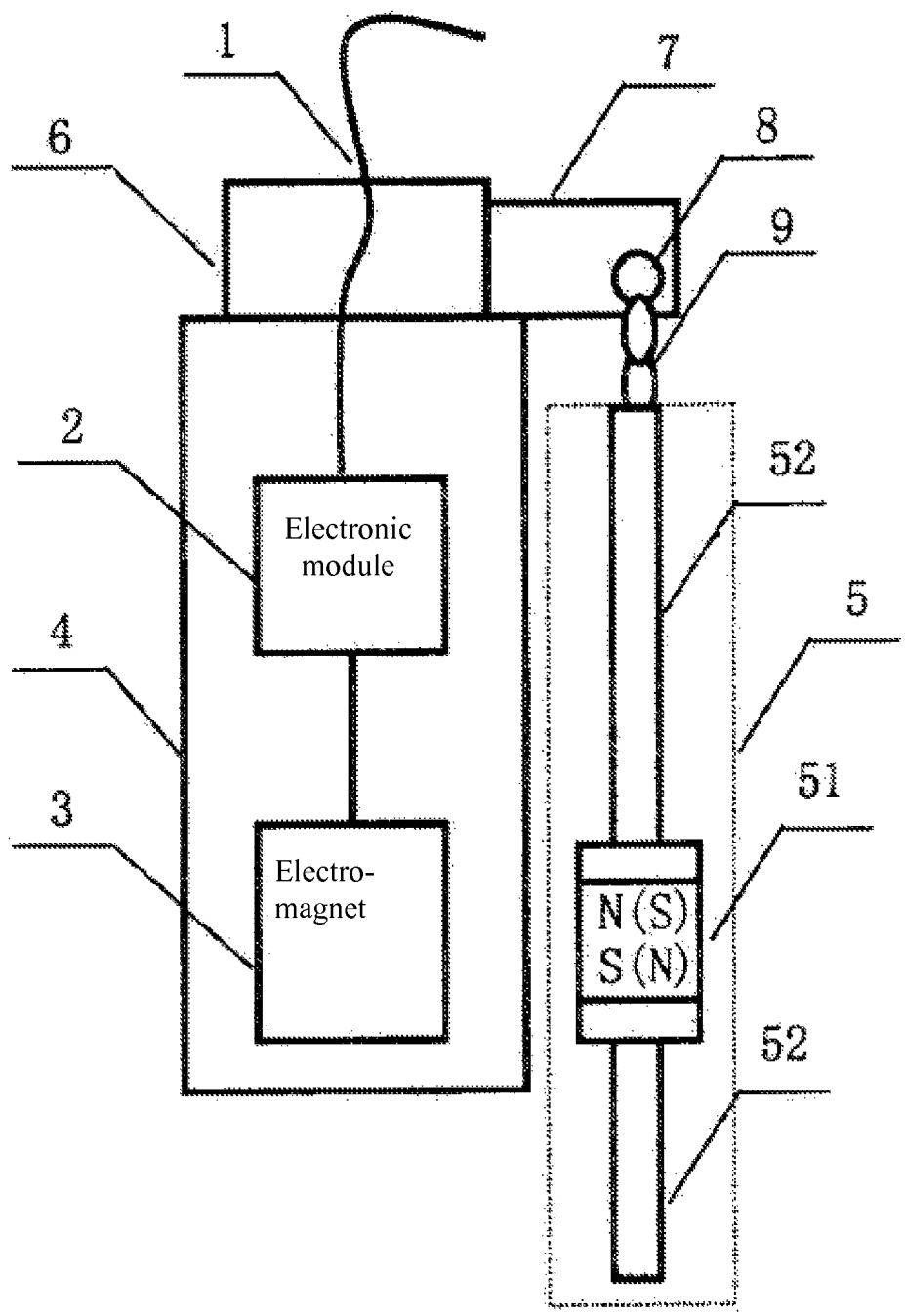
FIG. 2 is a cross-section of embodiment 1 of the present invention.

1—Lead-out wire, 2—Electronic module, 3—Electromagnet, 4—Housing, 5—Magnetic swinging rod, 6—Lead-out wire interface, 7—Support, 8—Suspension mounting hole, 9—Mobile suspension rings, 10—Installation flange, 11—Installation sleeve, 12—Silo board, 13—Heat-radiating fins, 14—Sleeve flange, 15—Connecting wire, 16—Sealed cover, 21—Power supply circuit, 22—Pulse generating circuit, 23—Pulse driving circuit, 24—Signal amplification circuit, 25—Signal processing circuit, 26—Signal time-delay output circuit, 31—Electromagnet iron core, 32—Electromagnet coil, 51—Permanent magnet pendulum, 52—Probe swinging rod.

DETAILED DESCRIPTION OF THE INVENTION

The present invention comprises a magnetic swinging rod 5, an electromagnet that is disposed on one side of the magnetic swinging rod 5, and an electronic module 2 that controls the electromagnet in driving the magnetic swinging rod 5 to swing, and amplifies, processes, and time-delay outputs the swinging signals of the magnetic swinging rod 5, which swinging signals are collected by the electromagnet 3, wherein:

Said magnetic swinging rod 5 is suspended with a suspension device on one side of a main housing 4, and the electromagnet 3, which is composed of an electromagnet iron core 31 and an electromagnet coil 32, is disposed inside the main housing.

Said electric module 2 comprises a power supply circuit 21, a pulse generation circuit 22, a pulse driving circuit 23, a signal amplification circuit 24, a signal processing circuit 25, and a signal time delay output circuit 26, and the aforementioned circuits are all disposed in the main housing 4 or are isolated from the main housing 4 and enclosed separately.

Said magnetic swinging rod 5 of the present invention is composed of a permanent magnet pendulum 51 and a probe swinging rod 52. The permanent magnet pendulum 51 is constructed from a permanent magnet which is disposed within a housing. The magnetic poles of the permanent magnet are arranged one above the other. In addition, the permanent magnet pendulum 51 is mounted on the probe swinging rod 52 and is near the electromagnet iron core 31. The pulse generating circuit 22 generates pulse signals and is connected to the pulse driving circuit 23. It is then connected to the electromagnet coil 32, which creates a pulse electromagnetic field, generating a magnetic field pushing force that repels the permanent magnet disposed on one side of the electromagnet 3, listed here as permanent magnet pendulum 51. Said permanent magnet pendulum 51 is so disposed as to strike the electromagnet iron core 31 on the return swing. The signal amplification circuit 24 is connected to the electromagnet coil 32, and it collects and then amplifies the voltage signals that were induced from the swings of the magnetic swinging rod 5. It is, moreover, connected to the signal processing circuit 25. The signal processing circuit 25 assesses the presence or absence of objects based on changes in the vibration amplitude or phase of the collected signals that were caused by the presence or absence of damping with respect to swings of the magnetic swinging rod 5. Moreover, it connects the object-position signals to the signal time-delay output circuit 26 and then outputs them to an alarm. Said suspension device comprises a support 7, a suspension mounting hole 8, and swingable suspension rings 9 or a swingable leaf spring, a swingable spring, or a swingable flexible cord. Said permanent magnet pendulum 51 is a short cylinder, a long cylinder, a sphere, a cone, or a cube. Said probe swinging rod 52 is a short tube, a long tube, a straight tube, or a curved tube; or, it can be a long tube on whose base is mounted a damping component, the damping component being vanes, a cylinder, a sphere, or a cone. Said main housing 4 is installed vertically or horizontally. An electronic module 2 and an electromagnet 3 are placed within the main housing 4 for normal-temperature object detection; or, the electromagnet 3 and the magnetic swinging rod 5 are placed in a high-temperature, high-pressure silo, with the electronic module 2 placed outside of the high-temperature, high-pressure silo for high-temperature object detection; or, the electromagnet coil 32, part of the iron core of the electromagnet iron core 31, and the electronic module 2 are placed outside the silo, and the other part of the iron core of the electromagnet iron core 31 and the magnetic swinging rod 5 are placed within the high-temperature, high-pressure silo for ultra-high-temperature object detection; or, only the extending portion of the probe swinging rod 52 is allowed to come into contact with the tested material, and the remaining parts are placed where the materials cannot touch them. This is for remote object detection. The electromagnet 3 is provided with a dual driving/signal-collection structure. As soon as the electromagnet 3 is energized, the electric current gives rise to a magnetic field, which generates a pushing force. As soon as the power is cut, the magnetic field gives rise to an electric current, and the swing signals of the magnetic swinging rod 5 are collected. Signals can also be collected by setting up any of the following as an independent component: a magnetoresistive sensor, a Hall proximity sensor, an electric vortex sensor, an inductive proximity sensor, piezoelectric elements, or an acceleration sensor.

The present invention is further explained in light of the attached drawings and the embodiments.

Embodiment 1

The electromagnetic pushing and knocking-type object detectors in FIGS. 1, 2, 6, and 7 are vertical, top-mounted models. The design consists of a lead-out wire 1, an electronic module 2, an electromagnet 3, a magnetic striking assembly, and a housing 4. The top of a housing 4 is provided with a lead-out wire interface 6. The lead-out wire interface 6 has a pipe thread. An end of a wire duct is screwed into the lead-out wire interface 6. The other end is secured to a silo-top silo board 12. The installation height can be freely adjusted according to the length of the wire duct. The wire duct not only protects and leads the lead-out wire 1 to outside of the silo, but also performs the role of installing and securing the electromagnetic pushing and knocking-type object detector. The magnetic striking assembly is composed of a magnetic swinging rod 5, mobile suspension rings 9, a suspension mounting hole 8, and a support 7. The support 7 is mounted on a housing 4, and on support 7 the suspension mounting hole 8 serves as a swinging fulcrum. Between the magnetic swinging rod 5 and the suspension mounting hole 8 one or more stainless steel mobile suspension rings 9 are used for mobile connection and are suspended near the electromagnet iron core 31. It can swing freely in all directions. The magnetic swinging rod 5 is composed of a permanent magnet pendulum 51 and a probe swinging rod 52. The permanent magnet pendulum 51 is constructed from a permanent magnet, which is disposed within a housing. The magnetic poles of the permanent magnet are arranged one above the other. In addition, the permanent magnet pendulum 51 is mounted on the probe swinging rod 52 and is near the electromagnet iron core 31. The lead-out wire 1 is led out from the electronic module 2. The electronic module 2 is connected to the electromagnet 3, and both are mounted within a housing 4. The electronic module 2 comprises a power supply circuit 21, a pulse generating circuit 22, a pulse driving circuit 23, a signal amplification circuit 24, a signal processing circuit 25, and a signal time-delay output circuit 26. The pulse generating circuit 22 is connected to the pulse driving circuit 23, and the pulse driving circuit 23 is connected to the electromagnet coil 32. The electromagnet coil 32 is connected to the signal amplification circuit 24. The signal amplification circuit 24 is connected to the signal processing circuit 25. The signal processing circuit 25 is connected to the signal time-delay output circuit 26. The power supply circuit 21 is connected to all of the circuits stated above. The lead-out wire 1 is connected to the signal time-delay output circuit 26 and the power supply circuit 21. The electromagnet 3 has dual functions: driving and signal collection. When there is no obstruction from materials, the magnetic swinging rod 5 will hang from near the electromagnet iron core 31 or be attached to the electromagnet iron core 31. The first event after the electromagnetic pushing and knocking-type object detector is energized is that the pulse generating circuit 22 generates pulse signals and outputs them to the pulse driving circuit 23, controlling the periodic pulse electric current flowing through the electromagnet coil 32, with the result that the electromagnet 3 generates a pulse electromagnetic field. Adjustments to the permanent magnet swinging rod 51 and electromagnetic field magnetic pole directions cause the two to generate a magnetic field pushing force from the same-charge repulsion generated between them. Because the electromagnet 3 is mounted within a housing 4, the magnetic swinging rod 5 can swing freely in all directions. Therefore, the magnetic field pushing force can only push the magnetic swinging rod 5 outward a certain distance from the electromagnet 3. After the pulse current dissipates, the electromagnetic field will also immediately dissipate. The magnetic swinging rod 5 immediately swings back or knocks against and again becomes attached to the electromagnet iron core 31. This is repeated again and again. The process of magnetic swinging rod 5 swinging back and striking the electromagnet iron core 31 causes changes in the magnetic flux passing through the electromagnet coil 32 and then, as a result of electromagnetic induction, generates voltage signals corresponding to the swings of the magnetic swinging rod 5. The polarity, amplitude of vibration, width, phase, frequency, and other such parameters of these induction voltage signals all correspond to the direction, speed, amplitude, frequency, and so on of the swings of the magnetic swinging rod 5. The damping to which the magnetic swinging rod 5 is subjected obviously varies according to the three media of gases, liquids, and solids. In a gaseous medium, the damping is minimal and can be ignored, and the induced voltage signals are the strongest. In a liquid medium, the damping is mid-range. The magnetic swinging rod 5 will tend to swing more slowly and somewhat more sluggishly than it does in a gaseous medium. Consequently, the phase of the voltage signals that are induced will lag behind somewhat. Amplitude, frequency, duration, and so on will all decrease to some extent. The maximum damping occurs in solids, perhaps even to the point that swinging becomes impossible and no voltage signals are induced. The signal amplification circuit 24 amplifies the voltage signals induced from the electromagnet coil 32 and inputs them into the signal processing circuit 25. The signal processing circuit 25 can determine whether a solid medium or a liquid medium is present according to the swings of the magnetic swinging rod 5 based on obvious differences in the vibration amplitude, phase, or other parameter of the voltage signals induced by the electromagnet 3 in the three media of gases, liquids, and solids. Moreover, it inputs these object-position signals into the signal time-delay output circuit 26, and, following a certain time-delay, they are led out through the lead-out wire 1 for indication, alarm, automatic control, or other such purposes.

Embodiment 2

Figure 3:
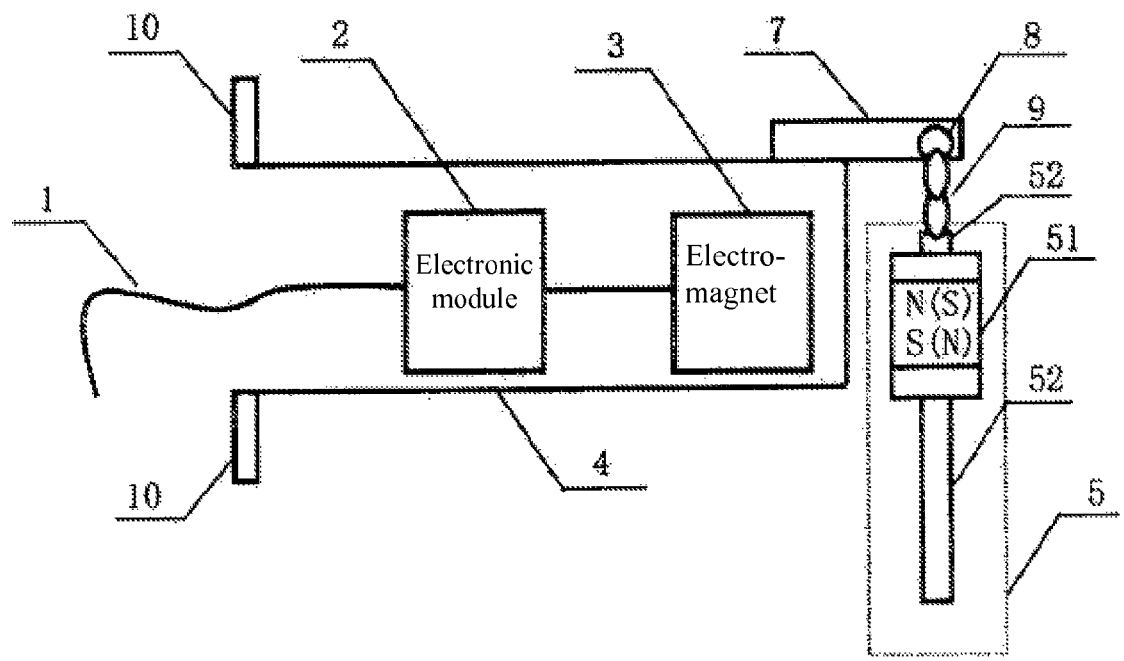
FIG. 3 is a cross-section of embodiment 2 of the present invention.
Figure 8:
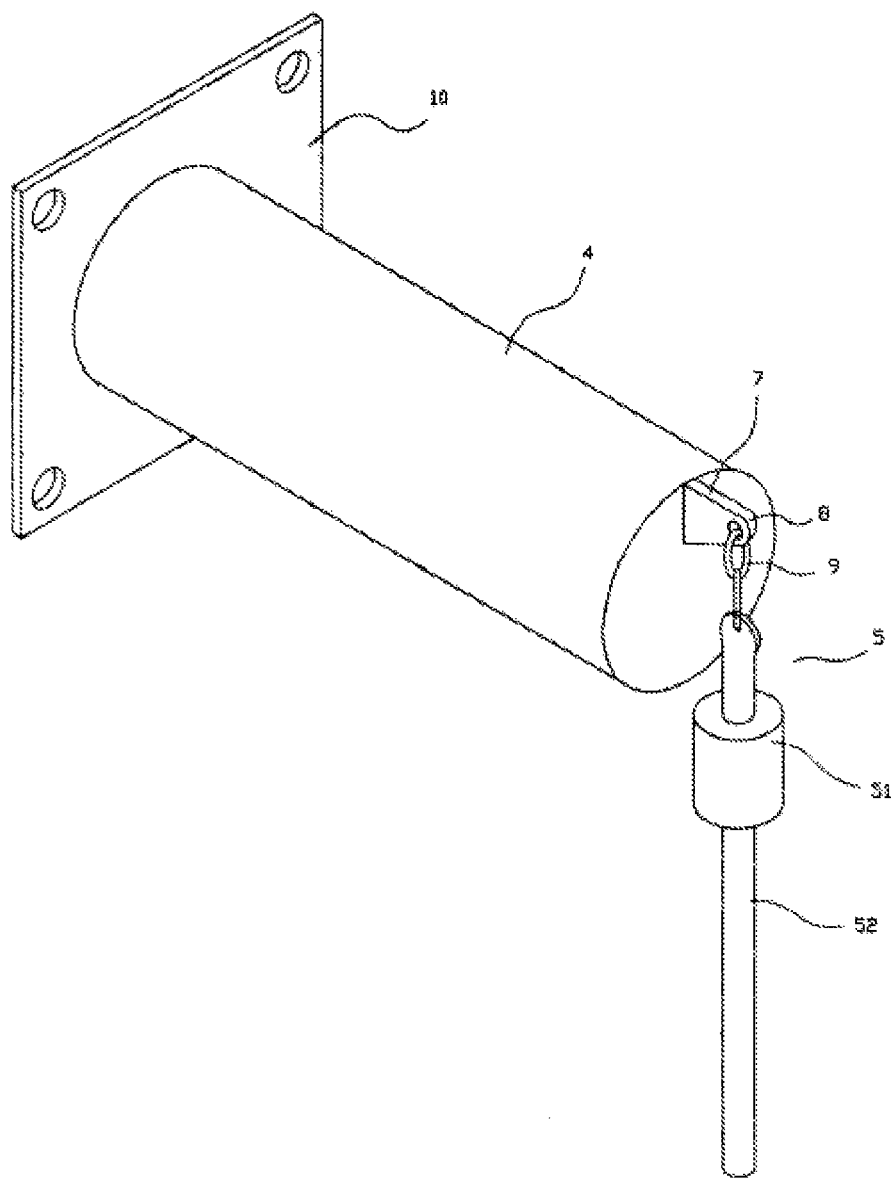
FIG. 8 is a third diagram of the exterior of the present invention.

The electromagnetic pushing and knocking-type object detectors in FIGS. 1, 3, and 8 are horizontal, side-mounted models. One end of a housing 4 is connected with the magnetic striking assembly. The other end has an installation flange 10, which is used to mount the electromagnetic pushing and knocking-type object detector directly on a silo board 12 or to mount it on the flange 14 of an installation sleeve. The installation flange 10 is provided with a wire outlet hole. The remainder of the structure is connected as in embodiment 1.

Embodiment 3

The present embodiment is a high-temperature, high-pressure electromagnetic pushing and knocking-type object detector. The entire electromagnet coil 32 in the electromagnetic pushing and knocking-type object detector of embodiments 1 and 2 makes use of a high-temperature-resistant electromagnetic wire. For example, Class H electromagnetic wire withstands 180 degrees; Class C electromagnetic wire withstands 220 degrees; PTFE-insulated electromagnetic wire can withstand 260 degrees; and ceramic-insulated electromagnetic can withstand 500 degrees. Mounted on magnetic swinging rod 5 is permanent magnet 52, which always uses a high-temperature-resistant magnet, such as a ferrite, neodymium, samarium-cobalt, or aluminum-nickel-cobalt magnet. Thus, the electromagnet 3 and the magnetic swinging rod 5 are placed in a high-temperature area within the silo. The electronic module 2, which cannot withstand high temperatures, is placed in a normal-temperature area. The electronic module 2 is connected to the electromagnet coil 32 with a connecting wire 15 to form a modular high-temperature-resistant structure. By connecting the remainder of the structure as in embodiments 1 and 2, one can construct a high-temperature, high-pressure electromagnetic pushing and knocking-type object detector.

Embodiment 4

Figure 4:
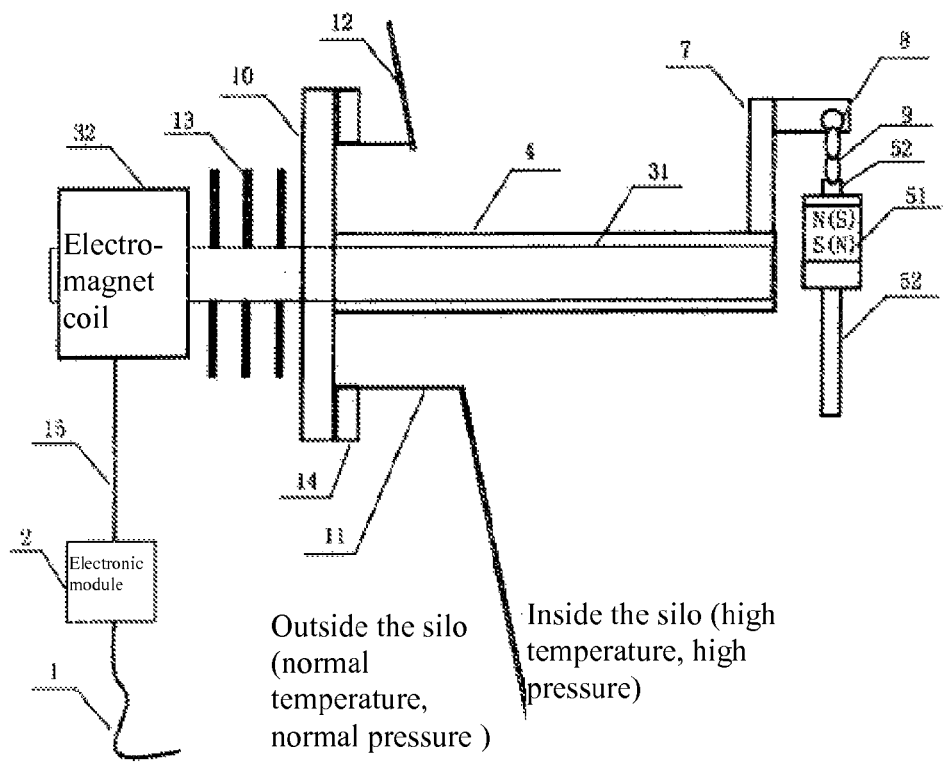
FIG. 4 is a cross-section of embodiment 4 of the present invention.

In FIG. 4, the present embodiment is an ultra-high-temperature, high-pressure electromagnetic pushing and knocking-type object detector. Because the iron core has little magnetic resistance, the magnetic field can be conducted with high efficiency in the iron core. One end of the electromagnet iron core 31 is lengthened so that it passes through the stainless steel flange 10 and extends a certain length into the silo. The iron core 31 is seamlessly connected with the stainless steel flange 10. A hole is opened in the silo board 12 and an installation sleeve 11 is welded to it. Welded on the other end of the installation sleeve 11 is installation sleeve flange 14. Stainless steel flange 10 is secured by bolts to the sleeve flange 14. To prevent corrosion of the iron core 31, the iron core 31 is covered by one layer of a stainless steel protective sleeve 4. The magnetic striking assembly is mounted on the iron core 31 in the silo or on the stainless steel protective sleeve 4 on the outside of the iron core. The magnetic swinging rod 5 is suspended at one end of the iron core 31 inside the silo. The electromagnet coil 32 and the other part of the iron core 31 are located on the outside of the installation flange 10. Mounted on the electromagnet housing and the iron core 31 outside the silo are heat-radiating fins 13. These reduce the amount of heat from high temperatures in the silo that is radiated and conducted to the electromagnet coil 32 so as to ensure that the temperature of the electromagnet coil 32 is within the permitted range. Thus, the magnetic swinging rod 5 with permanent magnet 52 may feature a high-temperature-resistant magnet, such as a samarium-cobalt or aluminum-nickel-cobalt magnet. The highest tolerable temperature is over 600 degrees. The electronic module 2 is placed in a normal-temperature area. The electronic module 2 is connected to the electromagnet coil 32 with connecting wire 15. This configuration results in an ultra-high-temperature, high-pressure electromagnetic pushing and knocking-type object detector. The remainder of the structure is connected as in embodiment 1.

Embodiment 5

Figure 5:
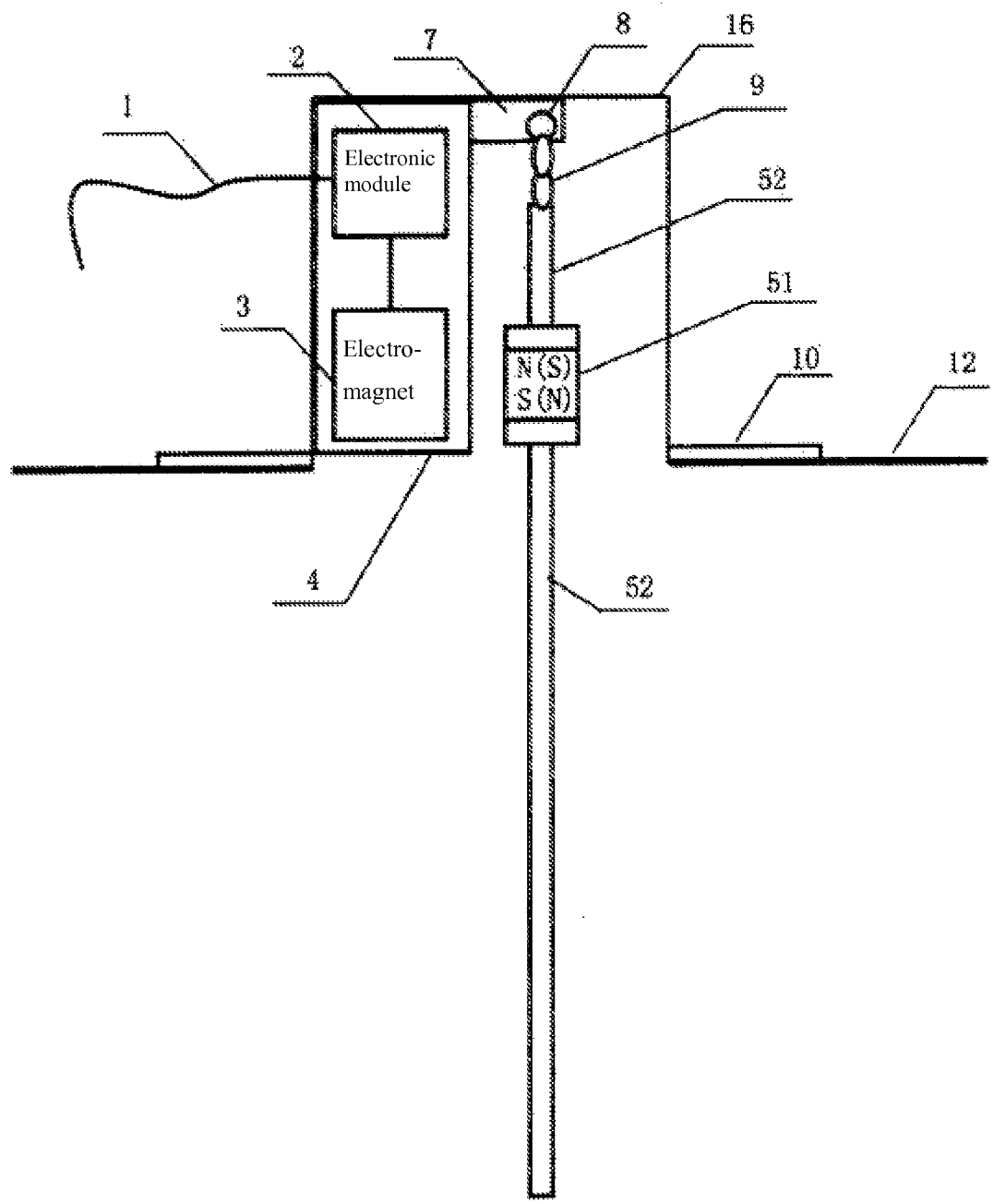
FIG. 5 is a cross-section of embodiment 5 of the present invention.
Figure 6:
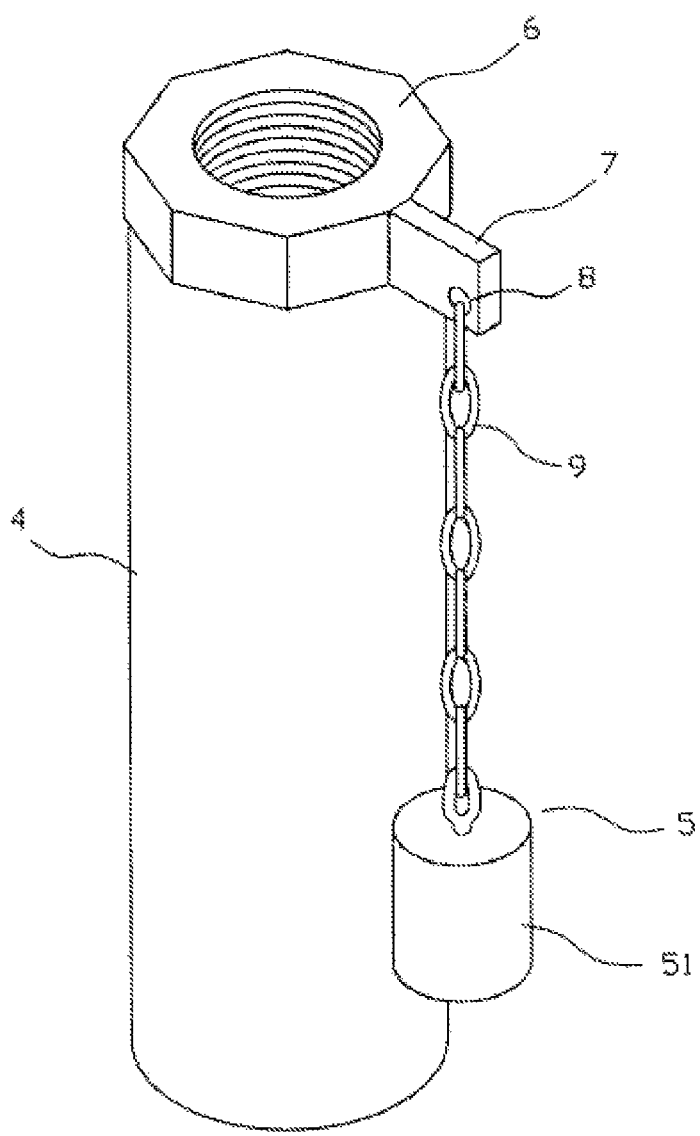
FIG. 6 is a first diagram of the exterior of the present invention.
Figure 7:
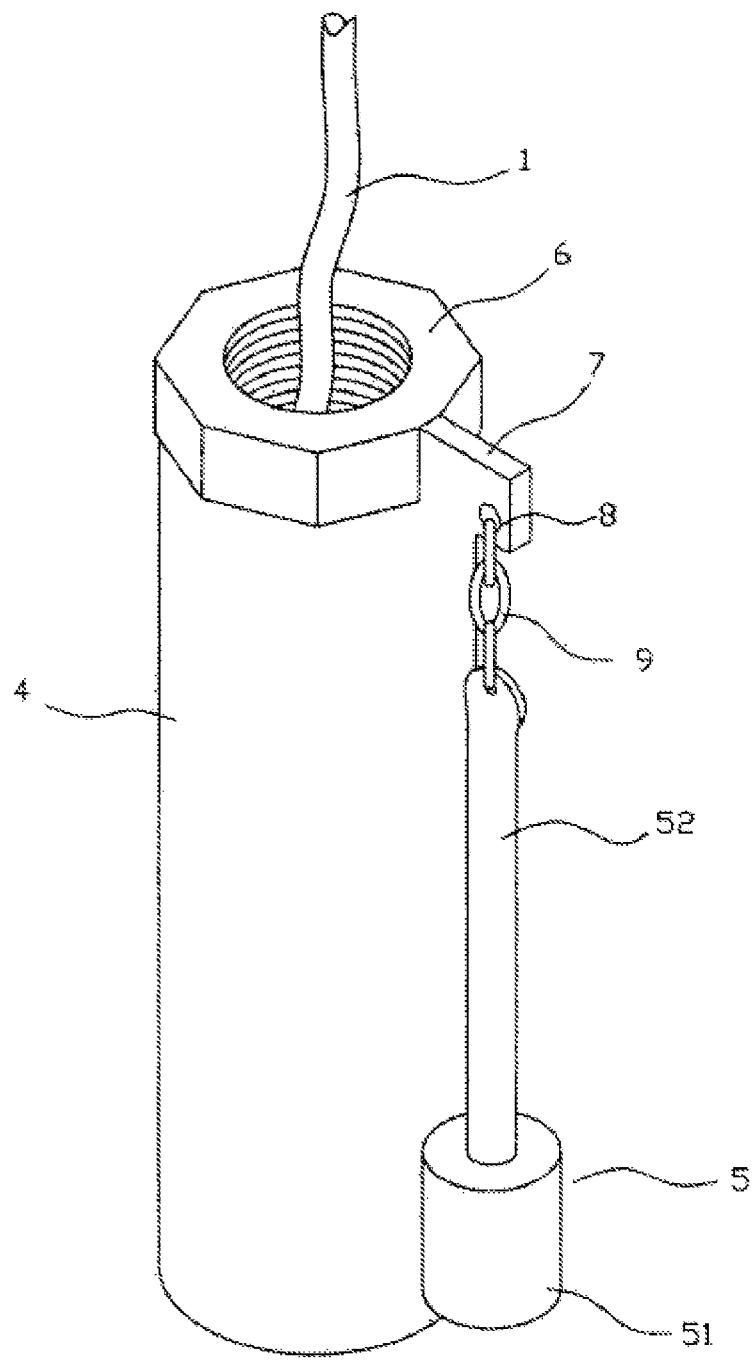
FIG. 7 is a second diagram of the exterior of the present invention.

In FIG. 5, the present embodiment is a remote measurement electromagnetic pushing and knocking-type object detector. An electronic module 2, an electromagnet 3, a housing 4, and a magnetic swinging rod 5 are placed under a silo-top sealed cover 16, and the lower end of the probe swinging rod 52 is lengthened. The position of the bottom end of the probe swinging rod 52 is the measurement position. The probe swinging rod 52 is a straight tube or a curved tube, or a damping component is mounted on its base, the damping component being vanes, a cylinder, a sphere, or a cone. The electromagnet 3 and the permanent magnet pendulum 51 part are prevented from ever coming into contact with materials, and only the lengthened portion of the probe swinging rod 52 is allowed to come into contact with materials. Therefore, the lower end of the magnetic swinging rod 5 is, within its normal swinging range, completely free of any material other than the measured material. It achieves safe and reliable remote detection of materials that are highly adhesive and highly corrosive; or cause significant wear; or block-type materials whose impact could damage the sensor with a powerful impact. Examples include strong acid and strong base solutions, cement mortar, melted asphalt, and stones. It has all the advantages of non-contact measurement with the reliability of contact measurement. The remainder of the structure is connected as in embodiment 1.

The embodiments described in connection with the present invention are merely descriptions of preferred forms of implementation of the present invention. They do not impose limitations on the concepts and scope of the present invention. Persons skilled in the art may carry out various modifications and improvements to the technical scheme of the present invention without departing from the design concept of the present invention. All such modifications and improvements shall fall within the protective scope of the present invention. All of the technical content whose protection is sought by the present invention has been fully recorded in the claims.

What I claim is:

1. An electromagnetic pushing and knocking-type object detector, characterized in that it comprises a magnetic swinging rod; an electromagnet that is disposed on one side of the magnetic swinging rod; and an electronic module that controls the electromagnet in driving the magnetic swinging rod to swing, and amplifies, processes, and time-delay outputs swinging signals of the magnetic swinging rod, which the swinging signals are collected by the electromagnet, wherein:

said magnetic swinging rod is suspended with a suspension device on one side of a main housing, and the electromagnet, which is composed of an electromagnet iron core and an electromagnet coil, is disposed inside the main housing;

said electronic module comprising a power supply circuit, a pulse generating circuit, a pulse driving circuit, a signal amplification circuit, a signal processing circuit which can determine whether a solid medium or liquid medium is present, and a signal time-delay output circuit, all of the above circuits being disposed within the main housing or being isolated from the main housing and enclosed separately.

2. The electromagnetic pushing and knocking-type object detector as described in claim 1, characterized in that said magnetic swinging rod is composed of a permanent magnet pendulum and a probe swinging rod, wherein the permanent magnet pendulum is constructed from a permanent magnet, the magnetic poles of the permanent magnet being arranged one above the other, and the permanent magnet pendulum being mounted on the probe swinging rod and being near the electromagnet iron core.

3. The electromagnetic pushing and knocking-type object detector as described in claim 1, characterized in that the pulse generating circuit generates pulse signals and is connected to the pulse driving circuit and is then connected to the electromagnet coil, which creates a pulse electromagnetic field, generating a magnetic field pushing force that repels the permanent magnet disposed on one side of the electromagnet, listed here as a permanent magnet pendulum.

4. The electromagnetic pushing and knocking-type object detector as described in claim 3, characterized in that said permanent magnet pendulum is so disposed as to strike the electromagnet iron core on the return swing, wherein the signal amplification circuit is connected to the electromagnet coil and collects and then amplifies the voltage signals that were induced from the swings of the magnetic swinging rod, and is connected to the signal processing circuit, the signal processing circuit assessing the presence or absence of objects based on changes in the vibration amplitude or phase of the collected signals which were caused by the presence or absence of damping with respect to swings of the magnetic swinging rod, and connects the object-position signals to signal the time-delay output circuit and then outputs them to an alarm.

5. The electromagnetic pushing and knocking-type object detector as described in claim 1, characterized in that said suspension device comprises a support, a suspension mounting hole, and swingable suspension rings, or a swingable leaf spring, or a swingable spring, or a swingable flexible cord.

6. The electromagnetic pushing and knocking-type object detector as described in claim 3, characterized in that said permanent magnet pendulum is a short cylinder, a long cylinder, a sphere, a cone, or a cube;

said probe swinging rod is a short tube, a long tube, a straight tube, or a curved tube; or it is a long tube on whose base is mounted a damping component, the damping component being vanes, a cylinder, a sphere, or a cone.

7. The electromagnetic pushing and knocking-type object detector as described in claim 1, characterized in that said main housing is installed vertically or horizontally, wherein the electronic module and the electromagnet are placed within the main housing for normal-temperature object detection, or the electromagnet and the magnetic swinging rod are placed in a high-temperature, high-pressure silo, with the electronic module placed outside of the high-temperature, high-pressure silo for high-temperature object detection, or the electromagnet coil, part of the iron core of the electromagnet iron core, and the electronic module are placed outside the silo, and the other part of the iron core of the electromagnet iron core and the magnetic swinging rod are placed within the high-temperature, high-pressure silo for ultra-high-temperature object detection, or only the extending portion of the probe swinging rod is allowed to come into contact with the tested material, and the remaining parts are placed where the materials cannot touch them, for remote object detection.

8. The electromagnetic pushing and knocking-type object detector as described in claim 1, characterized in that the electromagnet is provided with a dual driving/signal-collection structure;

upon energizing the electromagnet, an electric current giving rise to a magnetic field, which generates a pushing force; upon cutting power, the magnetic field giving rise to an electric current, and collecting the swing signals of the magnetic swinging rod, signals also being collectible by setting up any of the following as an independent component: a magnetoresistive sensor, a Hall proximity sensor, an electric vortex sensor, an inductive proximity sensor, piezoelectric elements, or an acceleration sensor.

* * * * *